United States Patent [19]
Posh

[11] Patent Number: 6,027,289
[45] Date of Patent: Feb. 22, 2000

[54] LATERAL MOVEMENT ROUTER GUIDE

[76] Inventor: Ransom Posh, 31249 Six Mile Rd., Livonia, Mich. 48152

[21] Appl. No.: 08/961,481

[22] Filed: Oct. 31, 1997

Related U.S. Application Data

[63] Continuation-in-part of application No. 08/425,184, Apr. 19, 1995, Pat. No. 5,772,368.

[51] Int. Cl.⁷ .................................. B23C 1/20; B27C 5/10
[52] U.S. Cl. ...................... 409/180; 144/136.95; 409/182
[58] Field of Search .................................. 409/182, 180, 409/175; 144/136.95, 154.5, 135.2

[56] References Cited

U.S. PATENT DOCUMENTS

| | | | |
|---|---|---|---|
| D. 337,501 | 7/1993 | Witt | D8/70 |
| D. 337,502 | 7/1993 | Witt | D8/70 |
| D. 338,213 | 8/1993 | Witt | D15/139 |
| D. 338,774 | 8/1993 | Witt | D8/71 |
| D. 338,821 | 8/1993 | Witt | D8/71 |
| 2,630,152 | 3/1953 | Turnball | 144/136 |
| 2,702,569 | 2/1955 | Yelle | 144/136 |
| 2,839,107 | 6/1958 | Emmons | 144/136.95 |
| 2,970,618 | 2/1961 | Mitchell | 144/136.95 |
| 3,494,394 | 2/1970 | Stock | 144/136.95 |
| 3,601,004 | 8/1971 | Oshiro | 90/12 |
| 3,853,160 | 12/1974 | Posey | 144/137 |
| 4,084,629 | 4/1978 | Kreusler | 144/134 |
| 4,099,552 | 7/1978 | Dyball | 144/154.5 |
| 4,290,464 | 9/1981 | Marsan | 144/136 |
| 4,312,391 | 1/1982 | Snow | 144/1 |
| 4,454,898 | 6/1984 | Pavnica | 144/1 |
| 4,572,715 | 2/1986 | Wolff | 409/180 |
| 4,630,657 | 12/1986 | Obradovich | 409/182 X |
| 4,655,653 | 4/1987 | Hall et al. | 409/182 |
| 4,674,548 | 6/1987 | Mills et al. | 144/134 |
| 4,696,331 | 9/1987 | Irland | 144/134 |
| 4,742,856 | 5/1988 | Hehr et al. | 144/371 |
| 4,827,996 | 5/1989 | Cotton et al. | 144/134 |
| 4,844,135 | 7/1989 | Witt | 144/371 |
| 4,947,908 | 8/1990 | O'Banion et al. | 144/353 |
| 4,977,938 | 12/1990 | Greeson | 144/134 |
| 5,005,617 | 4/1991 | Michaels | 144/134 |
| 5,013,195 | 5/1991 | Strazar | 409/180 |
| 5,028,179 | 7/1991 | Grasset | 409/180 |

FOREIGN PATENT DOCUMENTS 3537992  5/1987  Germany.

OTHER PUBLICATIONS

Woodhaven Product Brochure.

*Primary Examiner*—William Briggs
*Attorney, Agent, or Firm*—Gifford, Krass, Groh, Sprinkle, Anderson & Citkowski, PC

[57] ABSTRACT

A router guide attachment adapted for mounting on the underside of both specialized and standard router base plates accommodates workpieces having both straight and curved edges. In one disclosed embodiment, one or more rigid members includes a slotted aperture, with one or more mounting fasteners being used to adjustably secure the guide in position at a desired lateral depth by inserting each mounting fastener through at least one of the slotted apertures and into one of the base plate holes. One or more of the workpiece-contacting surfaces may further include a wheel rotatably mounted to the rigid member, facilitating rolling engagement against the workpiece. In an alternative embodiment, a plurality of physically separated rigid members are provided, each having a slotted aperture and one or more workpiece-contacting surfaces.

7 Claims, 9 Drawing Sheets

1 …

LATERAL MOVEMENT ROUTER GUIDE

REFERENCE TO RELATED APPLICATION

This is a continuation-in-part of U.S. patent application Ser. No. 08/425,184, filed Apr. 19, 1995 U.S. Pat. No. 5,772,368

FIELD OF THE INVENTION

The present invention relates generally to power tools and more particularly to hand-held routers. Even more particularly, this invention is directed toward a guide which controls lateral movement of the router.

BACKGROUND OF THE INVENTION

Routers are extremely versatile tools which may be used for a variety of applications, including contoured moldings, dovetail joints, and so forth. In many such applications, it is desirable to maintain consistent lateral depth control of a router bit with respect to the edge of a workpiece. While often such control is required relative to the straight edge of a workpiece, more complicated router applications may require lateral control with respect to a workpiece having a curved edge.

SUMMARY OF THE INVENTION

The present invention provides a router guide attachment adapted for mounting on the underside of both specialized and standard router base plates containing a plurality of base plate holes. Broadly, the invention includes one or more rigid guide members providing a plurality of workpiece contact surfaces enabling the guide to accommodate both straight and curved edges.

In a preferred embodiment, each of the rigid members includes a slotted aperture, with one or more mounting fasteners being used to adjustably secure the guide in position at a desired lateral depth by inserting each mounting fastener through at least one of the slotted apertures and into one of the base plate holes. Preferably as well, one or more of the workpiece-contacting surfaces includes a wheel rotatably mounted to the rigid member, facilitating rolling engagement against the workpiece.

Each of the members may further comprise a member arm and a slotted flange extending from the member arm, the slotted flange having a second slot to allow adjustable attachment to the slotted flange of an adjacent member. In this case, a flange fastener may be used for adjustably attaching the member to the adjacent member, the flange fastener capable of being tightened to immobilize the relative position of the workpiece-contacting surfaces and loosened to allow relative movement of the workpiece-contacting surfaces.

In an alternative embodiment, a guide according to the invention may include a plurality of physically separated rigid members, each member having a slotted aperture and providing one or more workpiece-contacting surfaces. One or more mounting fasteners are preferably used to adjustably securing each member in position at a desired lateral depth.

BRIEF DESCRIPTION OF THE DRAWINGS

FIG. 5C is a side view of a scissor-action lateral movement router guide according to the invention;

DETAILED DESCRIPTION OF THE PREFERRED EMBODIMENT

Figure 1:
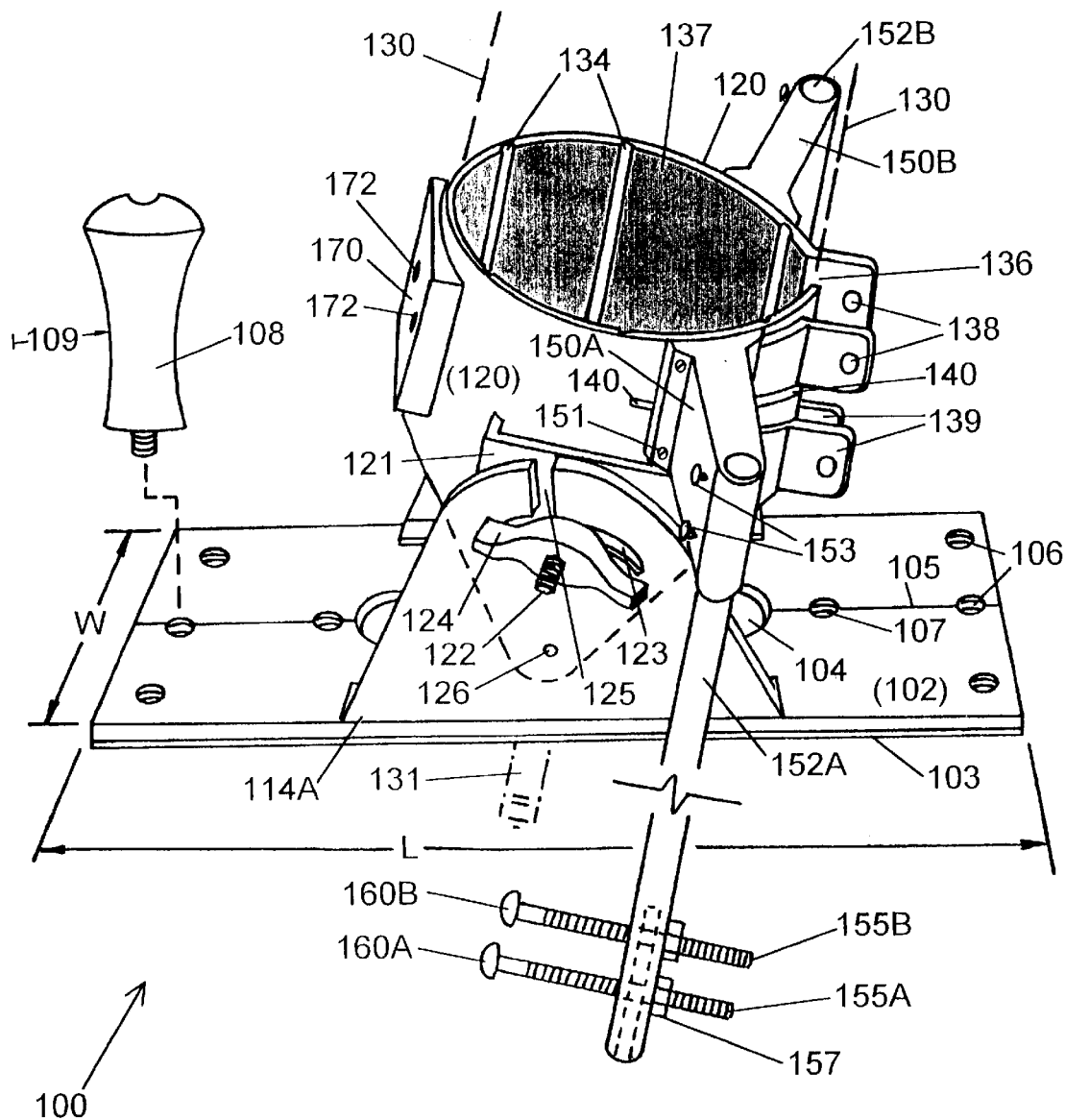
FIG. 1 is an oblique representation of a full-size router tilt base including optional guide arms.

FIG. 1 illustrates a preferred embodiment of the invention generally at 100. A table base 102, or "base" as it may be referred to herein, consists of a flat metal plate, preferably aluminum, though other materials such as steel and various alloys may alternatively be used. In the preferred embodiment, this plate is not solid, but instead utilizes a honeycomb casting with reinforcements in those areas subjected to greatest stress, for example, in and around the handle attachment points 106, and so forth. Additionally, a glide plate 103 is preferably securably affixed to the bottom surface of the base, the plate 103 being of a plastic such as plexiglass or other polymeric or dimensionally stable material which promotes easy sliding against a workpiece. The base 102 defines a length dimension L and a width dimension W, either one of which may be larger than the other, but in the preferred configuration, L exceeds W, as shown.

A central aperture 104 is formed through the base 102, preferably as a lengthwise slot to ensure that bit 131 attached to a motor in housing 130 depicted with broken lines does not make contact to the base 102 when tilted during use. The base 102 additionally preferably includes one or more threaded holes 106 to which one or more handles 108 may be removably secured, to meet the holding preferences of various users, including right- and left-handed operators. Threaded holes 107 are formed to accept shop-made guide or "swing" arms, as they are called, enabling one or more such arms to be attached to the underside of the base and secured to a pivot point, enabling the base and router with cutter bit attached to be used along large radii in accordance with the length of the guide or swing arm used. Additionally, a longitudinal score mark 105 is preferably produced on the upper surface of the base 102 precisely through the center line of the base, as shown, for alignment purposes during use.

On either side of the base 102 there is attached a pair of opposing pivot plates 114a and 114b, having bent tabs 115a and 115b forming rigid, upright, spaced-apart members perpendicular to the plane of base 102 when fastened in place. These pivot plates 114a and 114b may either be permanently adhered to the upper surface of the base 102 through the welding of the bent tabs 115a and 115b or, alternatively, the pivot plates may be removably secured to the upper surface of base 102 through the use of a plurality of fasteners, using, for example, screws with recessed heads (not shown).

A collar 120 is pivotably supported between these two pivot plates 114*a* and 114*b*, facilitating rotation of the collar around an axis defined by pivot points 126 (only one being shown). To provide for a more smooth pivoting action, angle plates with surfaces 121 are attached on opposing outward sides of collar 120, thus enabling sliding engagement against the inward facing surfaces associated with pivot plates 114*a* and 114*b*. Although the surfaces may be formed onto bent plates, as shown, the collar 120 may alternatively be cast in unitary fashion with solid portions protruding outwardly from either side with these outer surfaces being formed through a machining process, resulting a configuration or similar to that depicted in FIG. 6. A wing nut 124 or other suitable hand-operated fastener is included on both sides of the assembly to lockingly engage the collar 120 at a desired orientation. Loosening of the wing nut 124 enables outward threaded rod 122 to rotate within slot 123. One or more "click stops" may further optionally be provided to engage the collar at often used angles such as 0°, 45°, 22½°, 30°, and so forth.

As shown in FIG. 1, either or both of the pivot support plates 114*a* and/or 114*b* may include a split area 125, thereby enabling the wing nuts 124 to be removed on both sides, allowing the collar 120 to be lifted out by moving the threaded stud 122 through the slot 125. The collar, thus removed may then be used in independent fashion, is described in further detail below with reference to FIG. 6. To facilitate removal, the pivot pins 126 on both sides also need to be disengaged or removed. This may be accomplished by providing pivot pins more or less in set-screw form, in which case they will be removed entirely as part of the collar removal process. Alternatively, however, the pivot pins may be configured and recessed in such a manner that they unscrew for a certain portion of their length, but then dangle freely while being retained by or partially within the pivot plates, thereby enabling the collar to be removed yet minimizing loss of the pins themselves. Although slots 125 may be formed in parallel, spaced-apart fashion on both plates, preferably, to ensure against an inadvertent disengagement of the collar, slot 125 is provided on only one side of the assembly. As a further guard against inadvertent loosening, the angle of the slot 125 is preferably not aligned with a popular setting such as 90° or 45°, but instead, is associated with an odd angle, for example 80°, 50°, etc.

Although the collar 120 may be configured to accept a particular motor housing, in the preferred embodiment, the collar 120 includes various features which enable it to accommodate router motor housings 130 supplied by different manufacturers utilizing different collar engaging styles. For example, the inner wall of the cylindrical collar 120 preferably includes a plurality of grooves 124, as certain manufacturers provide motor housings with small dimples or protrusions which slide within the collar to facilitate depth adjustment. In the preferred embodiment, six such grooves 134 are provided to accommodate full-size Porter Cable routers. Additionally, in the preferred embodiment, the collar 120 includes a vertical separation 136 along its entire length to accommodate router motors having only a single protrusion, typically associated with a rack-and-pinion type of depth adjustment mechanism. Black & Decker equipment, for example make use of such an adjustment mechanism. The width of this separation 136 is such that it does not interfere with the rack on the side of such motor housings, enabling it to slide up and down for depth adjustment purposes.

Regardless of router motor housing style, means are provided to lockingly engage the full-size motor housing into the collar. In the preferred embodiment, tabs 138 and 139 are compressed with fasteners (not shown) to lock the router motor housing into position once a desired depth is realized. Although only one set of tabs would be sufficient for this purpose, two sets of tabs are preferably provided to ensure positive containment of the router motor housing in place. To ensure independent clamping action of the two sets of tabs, a transverse split 140 is also made in the collar between the two sets of tabs to minimize the effect of one set of tabs on the other during tightening. Preferably the inner wall of the collar 120 is also machine roughened or textured, as depicted by stipple marks 137. In the event the collar is cast, this surface roughening may be provided by simply avoiding to polish the inner cylindrical wall of the collar. As an alternative to the tabs 138 and 139 and associated compression-type fasteners (not shown), ski-boot style hinge wire capturing type of buckles may alternatively be used, which would facilitate a more straightforward securement and eliminate unattached components which might be lost.

Figure 2:
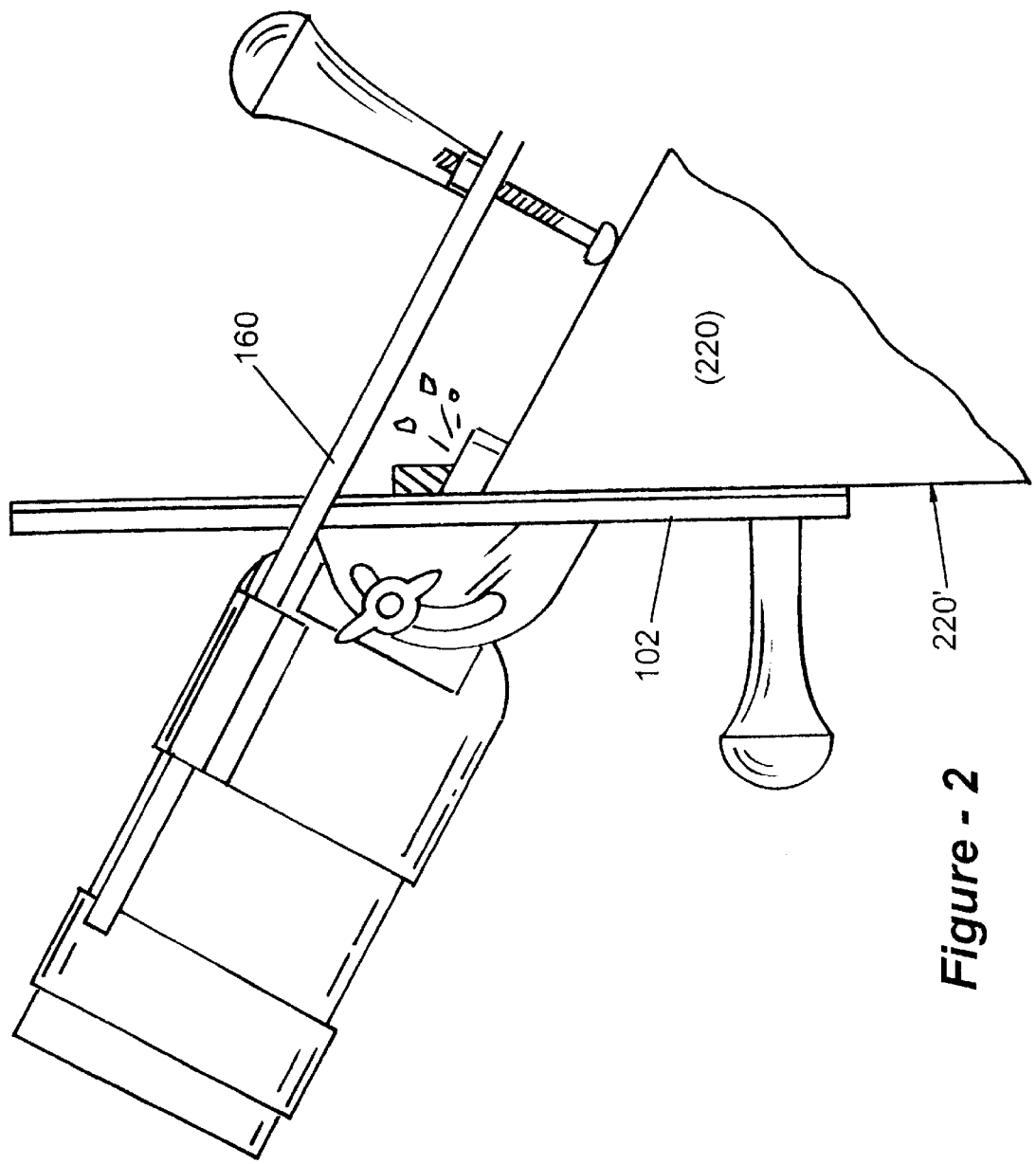
FIG. 2 is a side-view schematic representation of the router of FIG. 1 in use.
Figure 6:
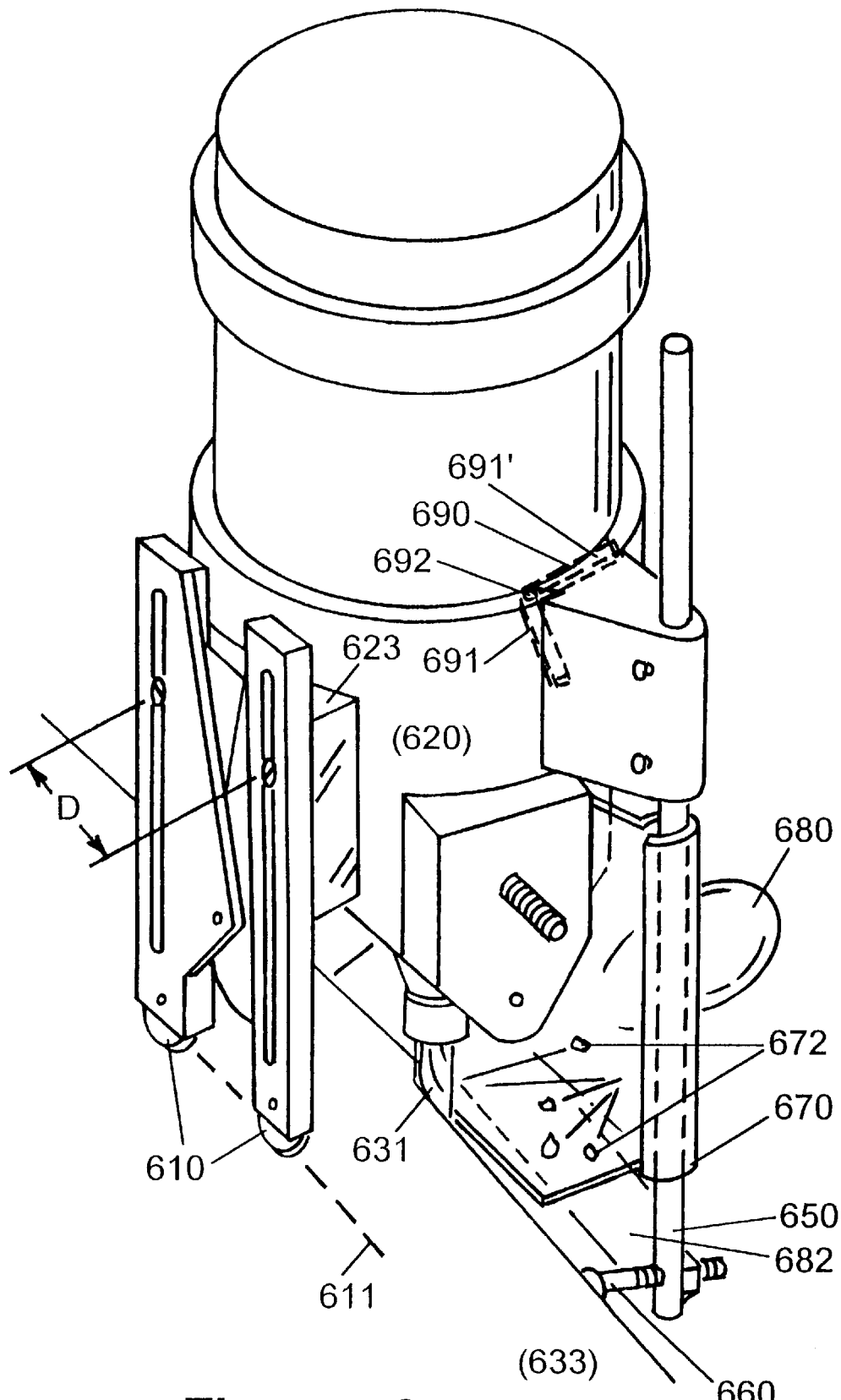
FIG. 6 is an oblique representation wherein the collar has been removed from the tilt base for independent use.

Continuing the reference to FIG. 1, the tilt base according to this invention preferably further includes a guide arm assembly to provide secondary contact against the workpiece to control lateral positioning of the bit with respect to the workpiece in addition to tiling of the bit and depth adjustment. This guide arm assembly includes two guide arms 152*a* and 152*b* on either side of the base 102 which are attached to the collar at one end through outward extensions 150*a* and 150*b*, having sufficient length to ensure that the arms 152*a* and 152*b* clear the outermost width dimension of the base 102 as the collar tilts. As shown, these extensions 150 are preferably removably secured to the outward walls of the collar 120 through screws 151, and the guide arms 152 are removably secured within the extensions using screws 153, facilitating an assembly which may be readily dismantled. As an alterative to the screws 151, as mentioned, a dovetail-type of arrangement may instead be used as shown in FIG. 6. The distal ends of the guide arms 152 each include a standoff 155 having a head 160 which rides against a secondary surface of the workpiece as shown in FIG. 2. Nuts 157 are provided to adjust the surfaces 160 in accordance with the type of bit used, and other factors. Also optionally attached or integrally formed with the collar is a plate 170 having threaded holes 172 to which a depth guide may be removably secured when a collar is used in independent form as further discussed with reference to FIG. 6. As an alternative to a large surface having the two holes 172, two separate surfaces, or tabs each associated with a mounting hole, or other configurations, may alternatively yet optionally be provided for this purpose.

Now turning to FIG. 2, the tilt base discussed with reference to FIG. 1, complete with optional guide arm assemblies, is shown during use. The bottom surface of the plate 102 moves slidingly with respect to a first surface of the workpiece 220, ordinarily a flat surface of the workpiece, while the guide arms with surfaces 160 ride against a secondary surface of the workpiece, thus assuring overall control of bit depth, tilt angle and lateral movement. In the preferred embodiment two surfaces are associated with the guide arm assembly, the secondary surface 220' of the workpiece may be flat or curving while maintaining control of the cutting process. In the preferred embodiment, the cylindrical shape of the collar is truncated on either side at an angle of substantially 45°, enabling the collar to tilt slightly greater than 45° in one direction, such as 47°, and at least 30° in the other direction, for example, 35°, the shorter angular extent in one direction as compared to the other being limited by the striking of tabs 139 against the upper surface of the base 102. Although in a preferred embodiment the collar is truncated substantially at 45° to facilitate the tilting just described, it should of course be recognized that the physical configuration may be changed and adapted to facilitate a wider tilting angle, including a full 45° to either side, or even greater angles, depending upon the placement or elimination of tabs 139, the length of the aperture 104, the distance of the pivot pins 126 with respect to the upper surface of base 102, and so forth.

The tilting action provided by the present invention facilitates a number of versatile uses beyond angled cutting. For example, with the base held in a steady orientation, and with the wing nuts 124 slightly loosened to an extent which allows the collar to tilt freely relative to the base, and by further using an appropriate bit and a predetermined cut depth, the invention may advantageously be used to cut pockets of the type used in pocket joinery, indicative of style-and-rail type joints prevalent in cabinetry, furniture making, and so forth. Regardless of the application, one object of the present invention is to replace the existing standard base supplied with the router motor housing such that the standard base may never need to be used again. That is, in the preferred embodiment, the present invention provides all functions possible with the standard base but with many others described above and subsequently.

Figure 3:
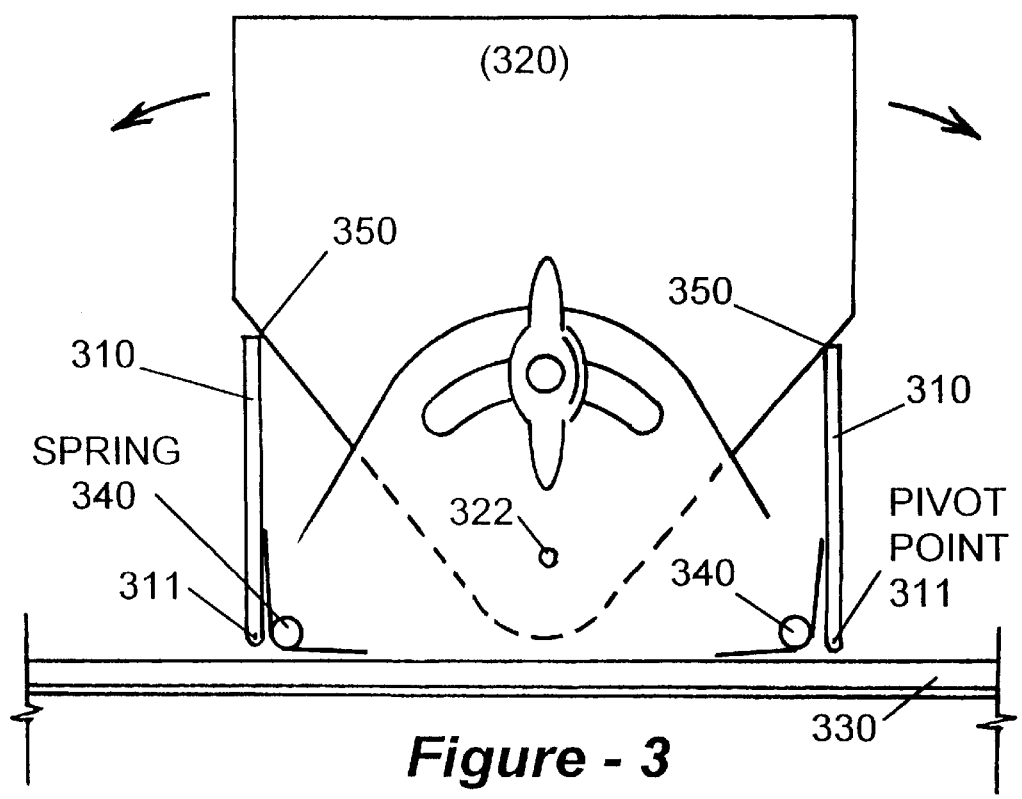
FIG. 3 is a drawing which illustrates a version of the invention including a first set of chip-deflection shields used with the tilt base.

Now making reference to FIG. 3, there is shown two optional chip deflectors 310 which may be hingedly supported forward and rearward of the collar 320 which tilts about pivot pin 322, as shown by the arrows. In the preferred embodiment, these deflectors 310 are of a clear plastic material such as Plexiglas or Lexan, and are supported for hinging engagement about pivot points 311 formed near to the top surface of the base plate 330. Springs 340 are also provided in association with each of the clear deflectors, causing them to remain urged against some portion of the collar, for example at points 350. Thus, as the collar 320 tilts from left to right as shown in the figure, the deflectors 310 remain more or less parallel and in constant contact with edges on the collar. Note in FIG. 1 that the handle 108 is curved with radius 109 to ensure that the chip deflectors 310 will clear the handles on either side enabling positioning to its maximum extent.

FIG. 4 depicts an optional horizontal depth guide which may be used in lieu of the guide-arm assembly described above, that of FIG. 4 being a straight edge guide, depicted generally at 412. Two bolts 413 are inserted through slots 414 to fasten the edge guide to the underside of the base, having adjusted the notch 420 relative to the cutting bit 411. A step-shape lip 430 is preferably formed along one edge of the guide, thus assisting in carrying debris away from the surface 440 as it moves against and relative to a workpiece.

Figure 4:
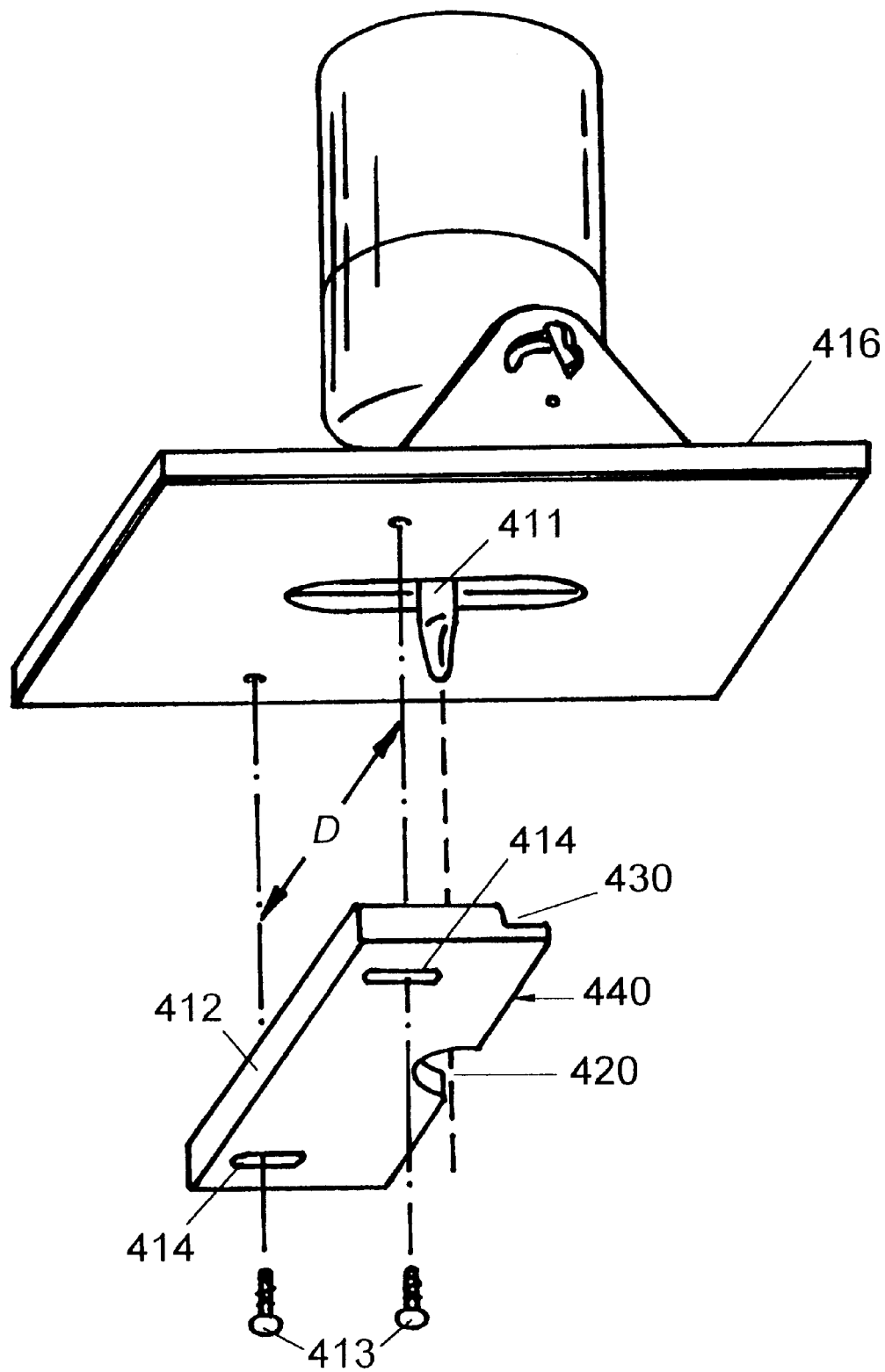
FIG. 4 illustrates an edge guide which may be attached to the full-size router tilt base to adjust horizontal depth with respect to a flat workpiece.

As FIG. 4 also illustrates the underside of the base, this drawing may also be conveniently used to show a circular recess 442, having dimensions adapted to receive a commercially available guide collar which are offered as standard accessories to all popular full size routers. Preferably, this recess 442 is adapted to accept the guide collar intended for use with Bosch manufactured routers, as this particular company also provides an adapter plate which rests in this recess 442 and further accepts guide collars of other manufacturers.

Figure 5A:
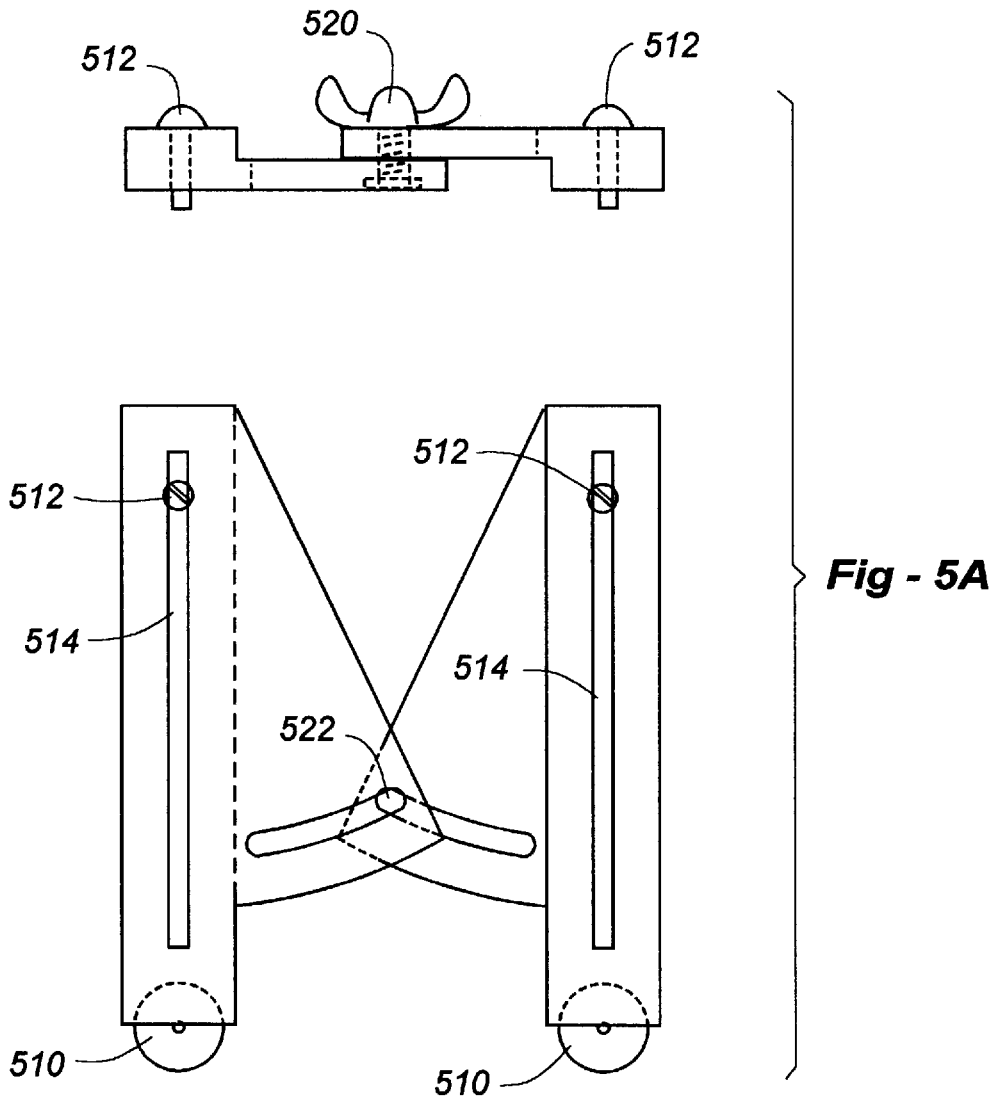
FIG. 5A depicts a scissor-action lateral movement router guide according to the invention.
Figure 5B:
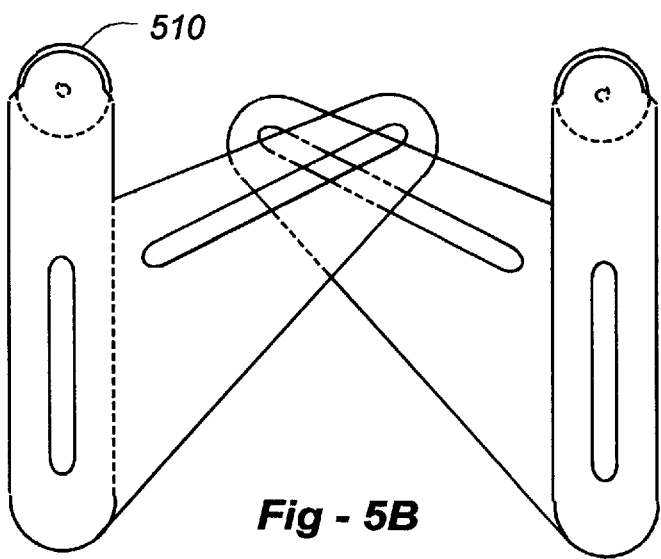
FIG. 5B illustrates a different geometry of the scissor-type lateral movement router guide of FIG. 5A.

FIGS. 5A–5C depict an alternative horizontal depth guides which may be mounted to the underside of the base of the full-size router tilt base to provide for lateral adjustment of the cutting bit, especially with respect to curved workpieces or work surfaces. That is, in contrast to the straight-edge guide of FIG. 4, the depth guide of FIG. 5 is particularly useful for workpieces having a non-straight edge against which the lateral adjustment mechanism must slidingly engage. As such, in place of a straight edge, two rollers 510, preferably of nylon, are rotatingly mounted to each of two guide arms which afford several degrees of freedom when mounted beneath the table base.

As shown in FIG. 5B, not only may direct lateral adjustment with regard to the workpiece being carried out with fasteners 512, enabling movement with the slots 514 substantially parallel to one another, a central wing nut 520 is also preferably additionally provided onto a threaded member 522 enabling an angle to be formed between the slots 514. As such, rollers 510 may be moved close together, almost touching, or apart to the extent shown in the figure, in concert with an overall lateral adjustment. In operation, the rollers 510 may be place furthest apart for curved workpiece surfaces of larger radii, but move close together for smaller radii workpiece surfaces. FIG. 5C illustrates an alternative lateral movement router guide according to the invention.

FIG. 6 is an oblique drawing of an alternative embodiment of the invention wherein the collar 620 has been removed from the tilt base, and wherein the horizontal guide of FIG. 5 has been mounted to block 623 as shown, enabling the rollers 610 to ride along the path depicted by the dashed line 611 as the cutter head 631 trims the edge 632 of a workpiece 633. It should be noted that although the horizontal guide assembly of FIG. 5 may double in an ideal way for the purpose shown in FIG. 6, given a spacing D of the threaded holes in block 623 equal to the spacing on the underside of the tilt base when the guide is used for horizontal depth, an entirely separate attachment may alternatively be included for this purpose, for example, a more or less solid plate with two slots and two rollers, or entirely separate arms, each with its own slot and roller, and so forth. Additionally, although screws are shown holding the guide to the block 623, any other appropriate attachment means alternatively be utilized, including wing nuts, thumb screws, and so forth.

In the configuration depicted in FIG. 6, as rollers 610 roll along path 611, the main guide arms 650 (only one of which is clearly visible in the figure), support the adjustment stand-offs 660 against a different surface of the workpiece 633 as the cutter head 631 affects the workpiece in accordance with bit configuration and the various settings. With the "horizontal" guide in place as shown in FIG. 6, in actuality, such guides control the vertical depth of the bit along the axis of the motor shaft, as opposed to horizontal depth, since, in this configuration, the horizontal guides are perpendicular with respect to their orientation when used on the bottom of the tilt base.

FIG. 6 also illustrates the use of an optional chip deflector 670 which may be convenient when the collar is removed and used in independent fashion as shown. Preferably, this deflector 670 includes opposing incomplete cylindrical side portions which clip onto the arms 650, and a bent flap portion 671 to maximize the surface area most likely to be exposed from flying debris 672 as the cutter head 631 performs its work. As with the deflector shields of FIG. 3, this chip-deflector 670 is constructed of a clear plastic material such as Plexiglas, Lucite, or the like.

FIG. 6 also further illustrates an alternative convenient method of attaching the guide arms supports to the collar, that is, instead of separate, multiple screw fasteners, or the like, a dovetail type of assembly 690 may alternatively be used, in conjunction with some sort of locking mechanism. Preferably, the guide arm support will pressure fit into the angled sleeve as shown, with a bar 691, hinged at point 692 being movable to a second position 691', thereby holding the guide arm support in place. Various other clips and attachment mechanisms may alternatively be used in this particular embodiment. A handle 680 which attaches centrally to plate 682 used to connect the two guide arms is also evident in the figure.

Figure 7:
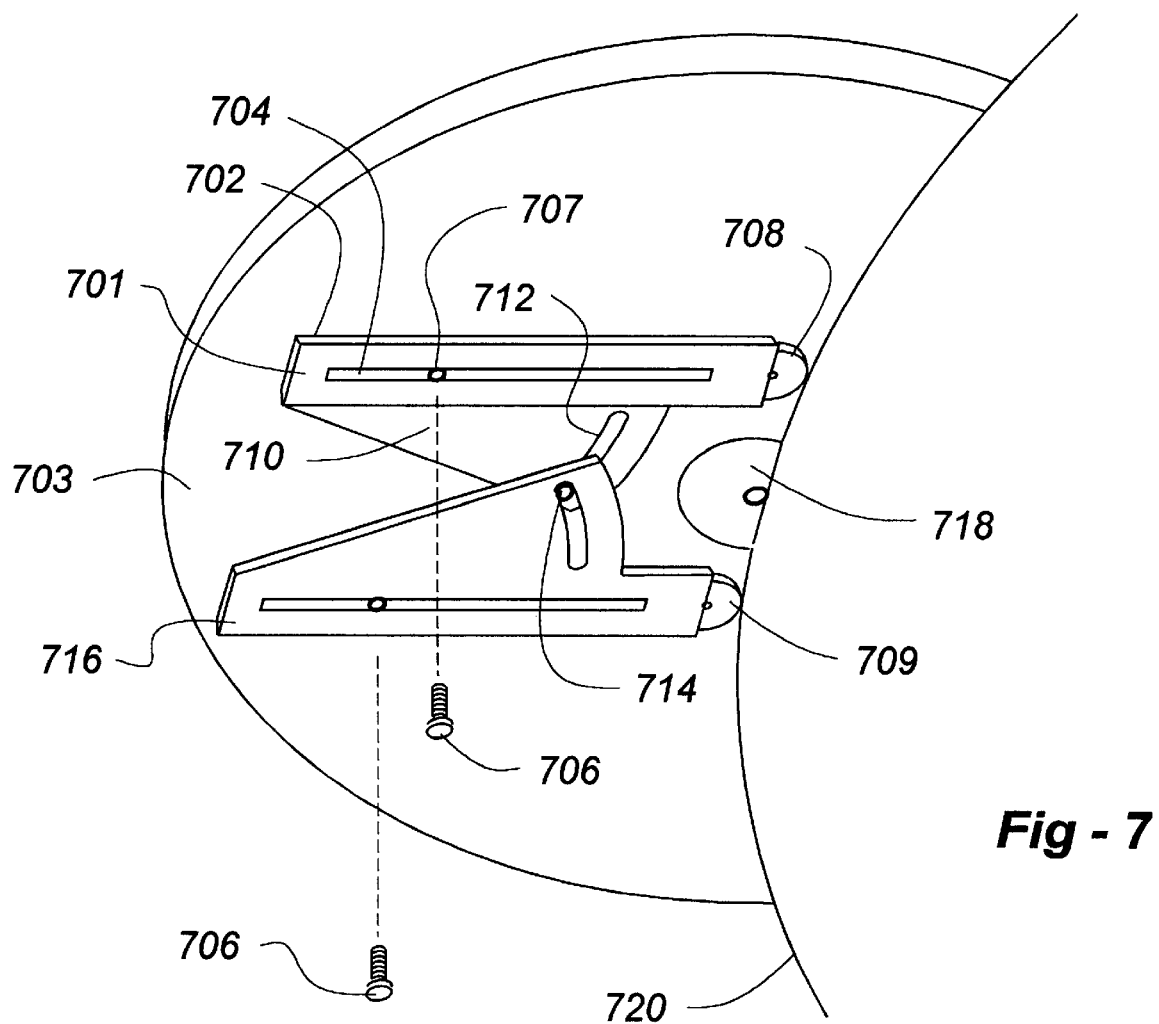
FIG. 7 illustrates a router guide which may be attached to the underside of a router base plate and may be adjusted in a scissors-like manner to control lateral depth.

It is important to point out that the use of the lateral guides discussed with respect to FIGS. 4–6 is not restricted to the tilt base described herein, but such guides and others discussed below are readily applicable to standard (i.e, non-tilting) standard routers as well. In this regard, reference is made to FIG. 7, which illustrates generally at 700 the lateral adjustment guide of FIG. 5 in use and attached to the underside of a standard router base plate 703. A rigid member depicted generally at 701 has a member arm 702 and a slotted flange 710, both preferably aluminum, though other materials such as steel, various alloys, rigid plastics, and rigid composites may alternatively be used. In the preferred embodiment, member arm 702 features a slotted hole 704 along its length to allow the rigid member 701 to slide and pivot about mounting fastener 706. The combination of the slotted hole 704 and the mounting fastener 706 provide the capability of adjusting lateral depth of the router bit in relation to the workpiece edge. The mounting fastener 706 is preferably a threaded bolt inserted through hole 704 and into a threaded hole 707 in the router base plate, enabling the fastener to be loosened to allow lateral adjustment of the router guide or tightened to hold the router guide immobile.

At an end of member arm 702, a wheel 708 is preferably rotatingly mounted. On one side of member arm 702 extends a slotted flange 710 in substantially the same plane as member arm 702. In the preferred embodiment, slotted flange 710 exhibits a curved slotted hole 712 that overlaps the flange and slotted hole of adjacent rigid member 716, such that flange fastener 714 adjustably attaches both flanges together. The pair of rigid members connected at flange fastener 714 preferably extend their wheeled end, including wheel 708, in the direction of router bit 718 to make contact with workpiece 720. The combination of the curved slotted holes in the flange and the flange fastener allow the user to adjust the relative spacing of wheels 708 and 709.

Figure 8:
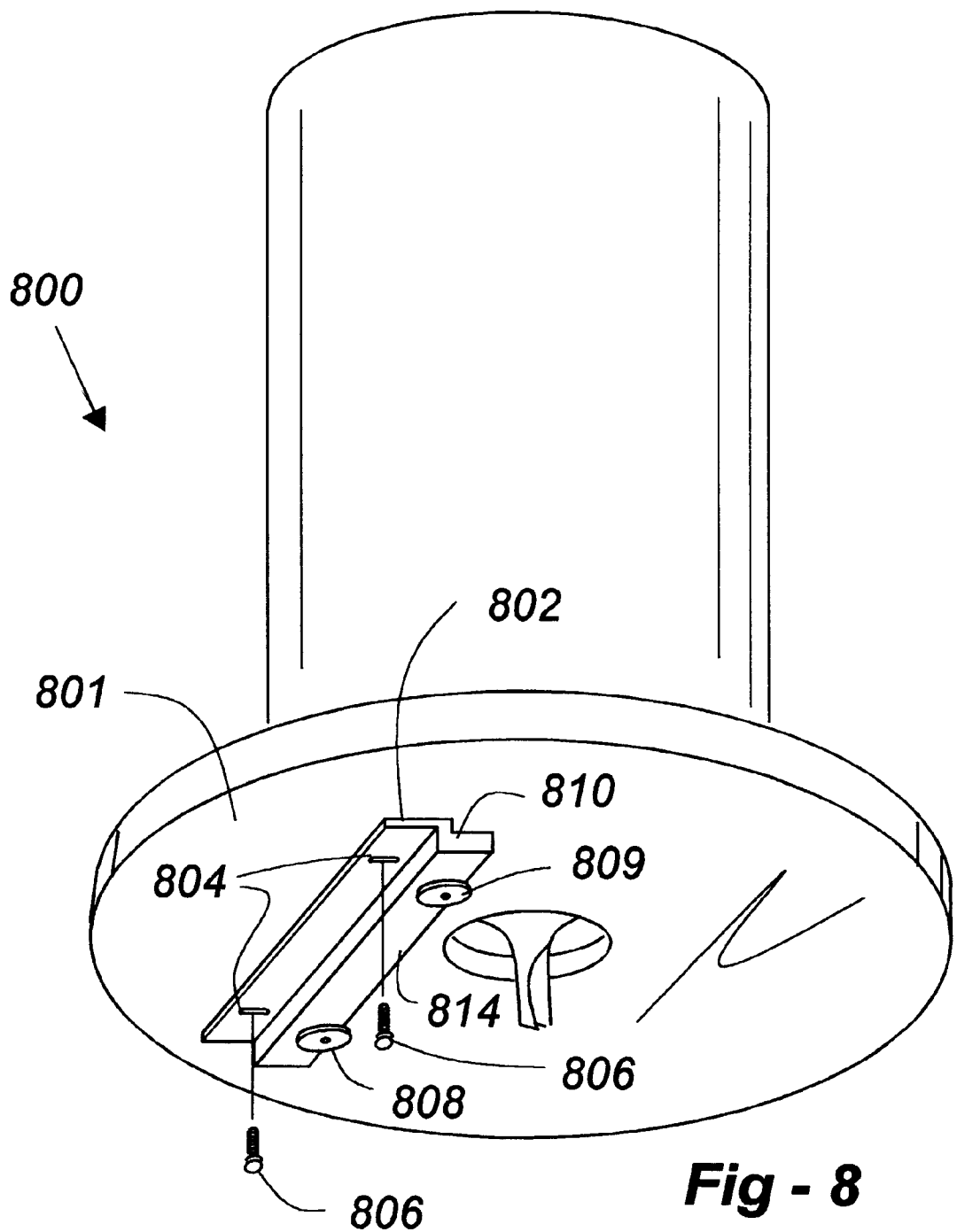
FIG. 8 illustrates an alternative lateral depth guide employing a single rigid member and two guide wheels.

FIG. 8 depicts an alternative router guide embodiment generally at 800. The router guide itself, 802, has slotted mounting holes 804 through which threaded bolts 806 are inserted. The threaded bolts further screw into threaded holes in the router base plate to mount the router guide securely to the router base plate 801. The slotted nature of mounting holes 804 allow the router guide to slide when the bolts are loosened, and to hold the router guide immobile when the bolts are tightened. Router guide 802 also has rotatingly mounted wheels 808 and 809 that extend toward router bit 812 from the edge of the router guide. The router guide also exhibits a step shaped lip 810, preferably formed along one edge of the router guide, thus assisting in carrying debris away from the router guide surface 814 as it moves relative to a workpiece.

Figure 9:
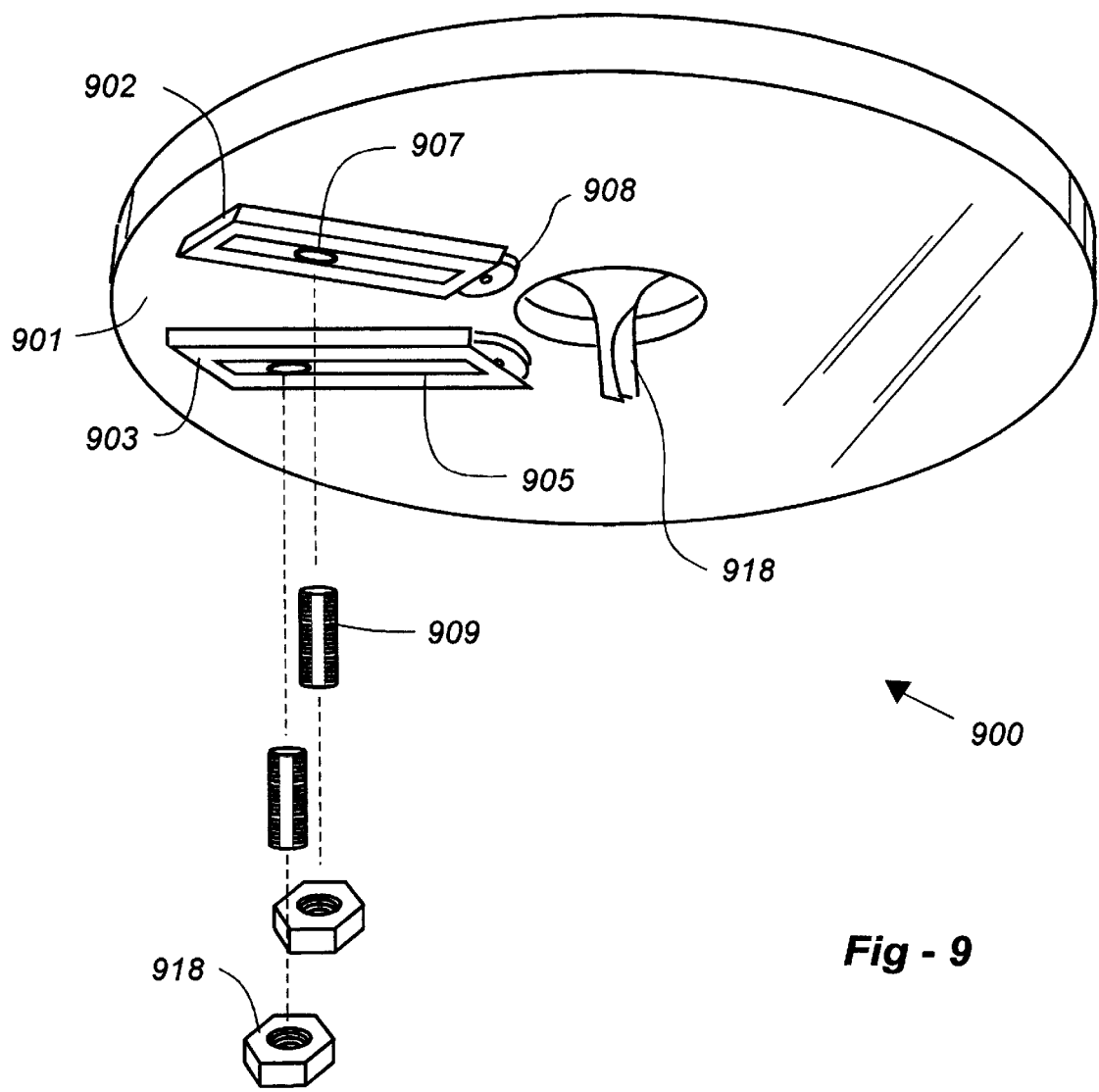
FIG. 9 depicts an alternative router guide employing two separate router guide members secured to a router base plate by a threaded rod and nut.

FIG. 9 illustrates yet a further alternative router guide embodiment generally at 900. The router guide includes two rigid members at 902 and 903 having slots 904 and 905, respectively. Each member provides a wheel, for example wheel 908, rotatably mounted at one end of the member to provide movable engagement of the workpiece. Member 902 is secured to the underside of base plate 901 by a threaded oval rod inserted through member slot 904 and into base plate hole 907. Threaded nut 910 is placed on threaded rod 909 and tightened against the member to hold it securely to the underside of the router base plate. When the nut 910 is loosened the member may be moved relative to the threaded rod as the rod slides along the slot in the member. This sliding capability gives each router guide member the capability of being adjusted in its lateral position relative to the router bit 918.

Having thus described my invention, I claim:

1. A router guide adapted for attachment to the underside of a router base plate, the router base plate containing a plurality of base plate holes, the guide being used to provide adjustable control of lateral depth relative to a workpiece, the guide comprising:

a plurality of rigid members providing a plurality of workpiece-contacting surfaces, each member featuring a member arm with a slotted aperture and a slotted flange extending therefrom, the slotted flange having its own aperture to facilitate adjustable coupling to the slotted flange of an adjacent member; and one or more mounting fasteners for adjustably securing the guide in position at a desired lateral depth, each mounting fastener being inserted through at least one slotted aperture and into one of the base plate holes.

2. The router guide of claim 1, wherein one or more of the workpiece-contacting surfaces is a wheel rotatably mounted to the member, the wheel adapted for rolling engagement with the workpiece.

3. The router guide of claim 1, wherein the mounting fastener is a threaded bolt, the bolt inserted into threaded holes in the router base plate.

4. The router guide of claim 1, further including a flange fastener for adjustably attaching the member to the adjacent member, the flange fastener capable of being tightened to immobilize the relative position of the workpiece-contacting surfaces and of being loosened to allow relative movement of the workpiece-contacting surfaces.

5. A router guide adapted for attachment to the underside of a router base plate, the router base plate containing a plurality of base plate holes, the guide being used to provide adjustable control of lateral depth relative to a workpiece, the guide comprising:

a plurality of rigid members, each of the members having a member arm with a slotted aperture and a slotted flange extending from the member arm, each member providing one or more workpiece-contacting surfaces;

a plurality of mounting fasteners for securing the guide in position at a desired lateral depth, each mounting fastener inserted through at least one slotted aperture and into one of the base plate holes; and a flange fasteners for securing the slotted flange of one of the members to the slotted flange of an adjacent member, the flange fastener capable of being tightened to immobilize the relative position of the workpiece surfaces and of being loosened to allow relative movement of the workpiece surfaces.

6. The router guide of claim 5, wherein each workpiece-contacting surface is a wheel rotatably mounted to the member, the wheel adapted for rolling engagement with the workpiece.

7. The router guide of claim 5, wherein the mounting fastener is a threaded bolt, the bolt inserted into threaded holes in the router base plate.

* * * * *

UNITED STATES PATENT AND TRADEMARK OFFICE
CERTIFICATE OF CORRECTION

PATENT NO.    : 6,027,289
DATED         : February 22, 2000
INVENTOR(S)   : Ranson Posh It is certified that error appears in the above-identified patent and that said Letters Patent is hereby corrected as shown below:

Drawings, Sheet 5 of 9 - Top Figure of "Fig. 5A" should read --Fig. 5C--
Drawings, Sheet 5 of 9 - Center Figure of "Fig. 5A" should read --Fig. 5A--

Column 1:
Line 5 - After "1995" insert --.--
Line 6 - After "5,772,368" insert --,--
Line 31 - After "surfaces" insert --,--

Column 2:
Line 34 - Replace "plexiglass with --Plexiglass--

Column 3:
Line 12 - After "resulting" insert --in--

Column 4:
Line 25 - Replace "tiling" with --tilting--

Column 5:
Line 64 - After "depict" delete --an--

UNITED STATES PATENT AND TRADEMARK OFFICE
CERTIFICATE OF CORRECTION

PATENT NO.   : 6,027,289
DATED        : February 22, 2000
INVENTOR(S)  : Ranson Posh It is certified that error appears in the above-identified patent and that said Letters Patent is hereby corrected as shown below:

Column 6:
Line 18 - Replace "place" with --placed--

Column 6:
Line 40 - Before "alternatively" insert --can--

Column 8:
Line 53 - Replace "fasteners" with --fasteners--

Signed and Sealed this

Twelfth Day of June, 2001

*Nicholas P. Godici*

*Attest:*

*Attesting Officer*

NICHOLAS P. GODICI
*Acting Director of the United States Patent and Trademark Office*